(12) United States Patent
McQueeney

(10) Patent No.: US 7,356,814 B1
(45) Date of Patent: Apr. 8, 2008

(54) SYSTEM, METHOD, AND COMPUTER PROGRAM PRODUCT FOR COMMUNICATING WITH AN LDAP SERVER

(75) Inventor: Matthew R. McQueeney, Frisco, TX (US)

(73) Assignee: Electronic Data Systems Corporation, Plano, TX (US)

( * ) Notice: Subject to any disclaimer, the term of this patent is extended or adjusted under 35 U.S.C. 154(b) by 635 days.

(21) Appl. No.: 10/736,304

(22) Filed: Dec. 15, 2003

(51) Int. Cl.
*G06F 9/44* (2006.01)

(52) U.S. Cl. .................. 717/164; 717/137; 719/328

(58) Field of Classification Search ............... 717/100, 717/137, 164; 719/328, 330, 331
See application file for complete search history.

(56) References Cited

U.S. PATENT DOCUMENTS

| | | | |
|---|---|---|---|
| 6,289,382 B1 * | 9/2001 | Bowman-Amuah | 709/226 |
| 6,442,748 B1 * | 8/2002 | Bowman-Amuah | 717/108 |
| 6,529,909 B1 * | 3/2003 | Bowman-Amuah | 707/10 |
| 6,550,057 B1 * | 4/2003 | Bowman-Amuah | 717/126 |
| 6,601,233 B1 * | 7/2003 | Underwood | 717/102 |
| 6,601,234 B1 * | 7/2003 | Bowman-Amuah | 717/108 |
| 6,606,660 B1 * | 8/2003 | Bowman-Amuah | 709/227 |
| 6,606,744 B1 * | 8/2003 | Mikurak | 717/174 |
| 6,609,128 B1 * | 8/2003 | Underwood | 707/10 |
| 6,718,535 B1 * | 4/2004 | Underwood | 717/101 |
| 6,732,160 B2 | 5/2004 | Ambrosini et al. | |
| 6,738,776 B2 | 5/2004 | Kanameda | |
| 6,842,906 B1 * | 1/2005 | Bowman-Amuah | 719/330 |
| 7,047,525 B2 * | 5/2006 | Prunty et al. | 717/137 |
| 7,127,707 B1 * | 10/2006 | Mishra et al. | 717/137 |
| 7,191,434 B2 * | 3/2007 | Renouf | 717/148 |
| 7,210,131 B2 * | 4/2007 | Schmidt et al. | 717/137 |

OTHER PUBLICATIONS

Learning C#, O'Reilly , Jess Liberty, 2002, Introduction.*
LDAP Programming with JAVA, Rob Weltman et al, published 2000, pp. 49-163,243-340,377-421.*
Understanding and Deploying LDAP Directory Services, Timothy A. Howes et al, 1999, p. 388.*

* cited by examiner

*Primary Examiner*—Todd Ingberg
(74) *Attorney, Agent, or Firm*—Munck Butrus Carter, P.C.

(57) ABSTRACT

A system, method, and computer program product for communicating with an LDAP server. When an LDAP server call is required, the call is encapsulated in a wrapper class which then interacts with the LDAP server.

15 Claims, 5 Drawing Sheets

SYSTEM, METHOD, AND COMPUTER PROGRAM PRODUCT FOR COMMUNICATING WITH AN LDAP SERVER

TECHNICAL FIELD OF THE INVENTION

The present invention is directed, in general, to data processing system protocols and interactions.

BACKGROUND OF THE INVENTION

Lightweight Directory Access Protocol (LDAP) is an Internet protocol that email programs use to look up contact information from a server. LDAP-aware client programs can ask LDAP servers to look up entries in a wide variety of ways. LDAP servers index all the data in their entries, and "filters" may be used to select or return only specific entries.

The MICROSOFT LDAP software development kit (SDK) is designed to be used by C or C++ applications to communicate to a LDAP server. The LDAP SDK is designed to work with any LDAP server, even those not developed by MICROSOFT. Applications written using the MICROSOFT Net languages (VB, C#, ASP) are encouraged to use the Active Directory Services Interface (ADSI) to communicate with LDAP servers since the LDAP SDK is difficult to use with the .Net languages.

The problem is that ADSI is primarily designed to work with Active Directory and does not work well with other LDAP servers. One critical problem is that ADSI has trouble reading any custom attributes that have been added to an LDAP server.

There is, therefore, a need in the art for a system, process, and computer program product for communicating with LDAP servers.

SUMMARY OF THE INVENTION

A preferred embodiment provides a system, method, and computer program product for communicating with an LDAP server. When an LDAP server call is required, the call is encapsulated in a wrapper class which then interacts with the LDAP server.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Figure 1:
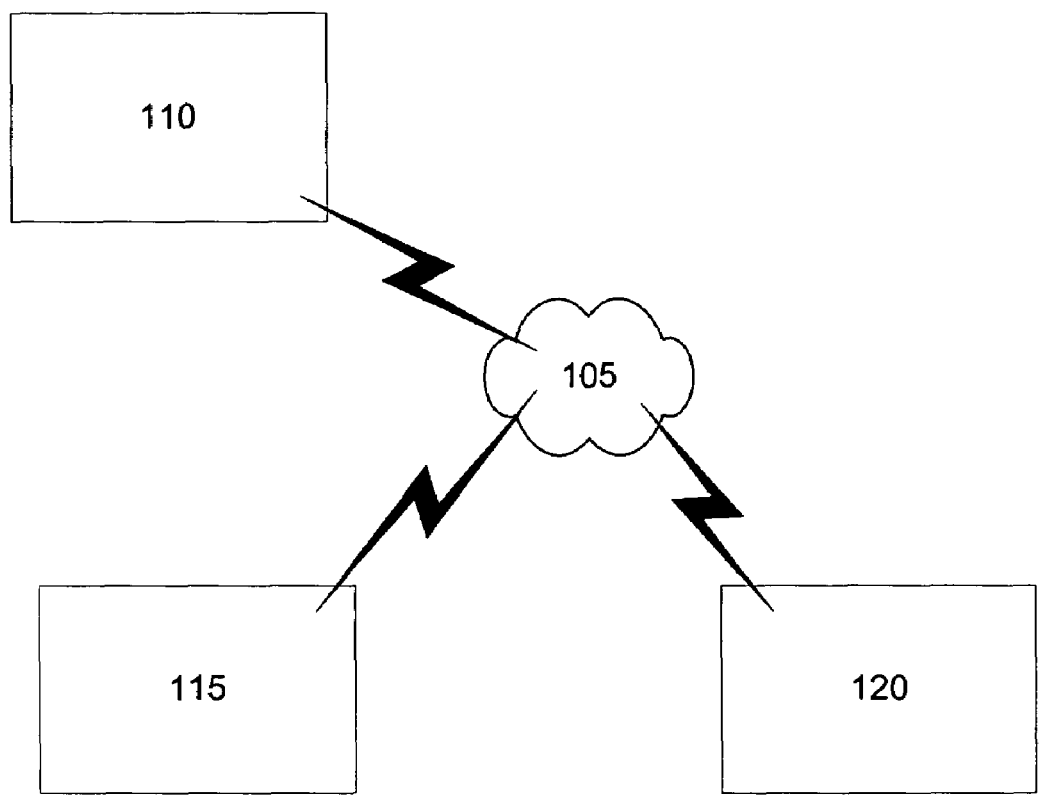
FIG. 1 depicts a block diagram of a data processing system network in which an embodiment of the present invention can be implemented.

FIG. 1 depicts a block diagram of a data processing system network in which an embodiment of the present invention can be implemented. In this figure, network 105 is any known type of computer network, including private networks or public networks such as the internet. While network 105 is shown in only one instance here; as known to those of skill in the art, network 105 can be implemented in multiple separate networks, or in the same public or private network system. Of course, any data or network communication described herein can be implemented using any known data communications means, such as via telephone modem, XDSL, fiber optic, wireless, etc., or public or private networks. These communications will include data pertaining to purchases and refunds, taxes, and other functions, as known in the art and/or as specifically described below.

Server 110 is shown communicating client systems 115/120 via network 155. Server system 110 is a data processing system server, configured to communicate with multiple different client systems, including client systems 115/120 and others.

It is understood that client systems 115/120 and server system 110 may be co-located or placed at different locations, or be otherwise structured as known to those of skill in the art, so long as they are capable of together performing the functions described and claimed herein.

Figure 2:
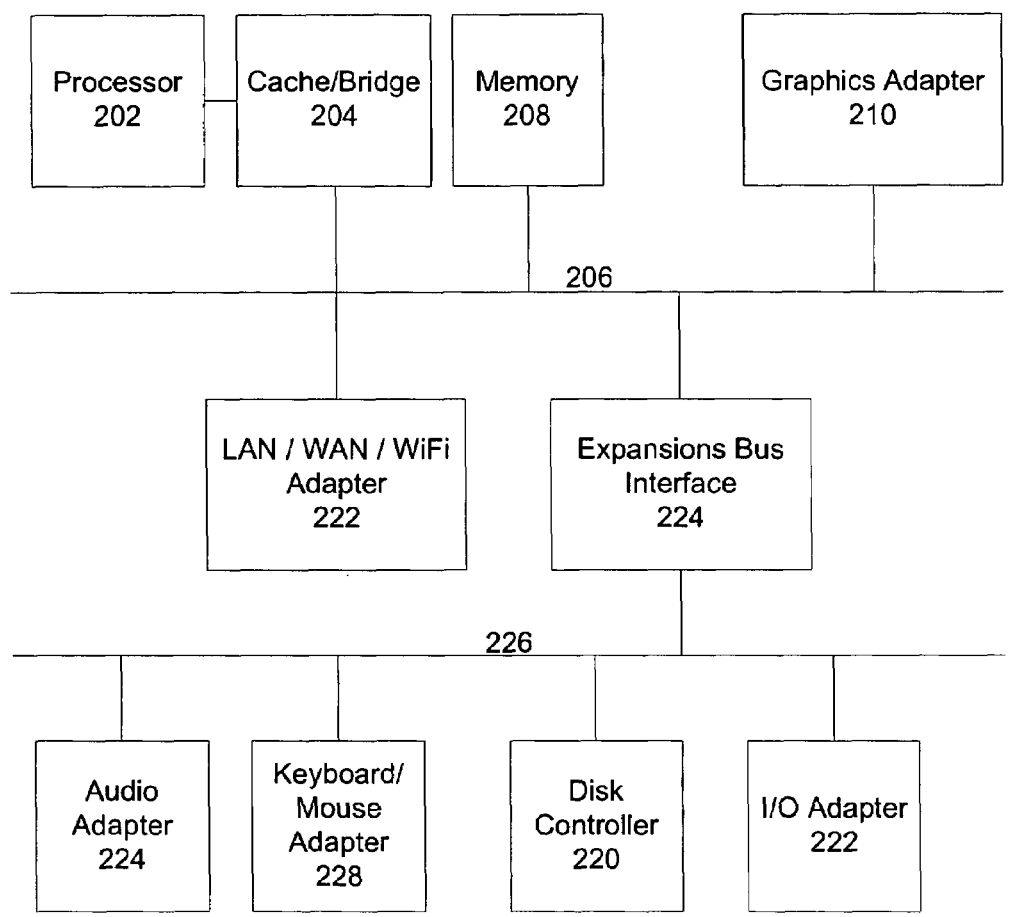
FIG. 2 depicts a block diagram of a data processing system in which a preferred embodiment can be implemented.

FIG. 2 depicts a block diagram of a data processing system in which a preferred embodiment can be implemented. The data processing system depicted includes a processor 102 connected to a level two cache/bridge 204, which is connected in turn to a local system bus 206. Local system bus 206 may be, for example, a peripheral component interconnect (PCI) architecture bus. Also connected to local system bus in the depicted example are a main memory 208 and a graphics adapter 210.

Other peripherals, such as local area network (LAN)/Wide Area Network/Wireless (e.g. WiFi) adapter 212, may also be connected to local system bus 206. Expansion bus interface 214 connects local system bus 206 to input/output (I/O) bus 216. I/O bus 216 is connected to keyboard/mouse adapter 218, disk controller 220, and I/O adapter 222.

Also connected to I/O bus 216 in the example shown is audio adapter 224, to which speakers (not shown) may be connected for playing sounds. Keyboard/mouse adapter 218 provides a connection for a pointing device (not shown), such as a mouse, trackball, trackpointer, etc.

Those of ordinary skill in the art will appreciate that the hardware depicted in FIG. 2 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of MICROSOFT Windows™, a product of Microsoft Corporation located in Redmond, Wash. may be employed if suitably modified. The operating system is modified or created in accordance with the present invention as described.

Figure 3A:
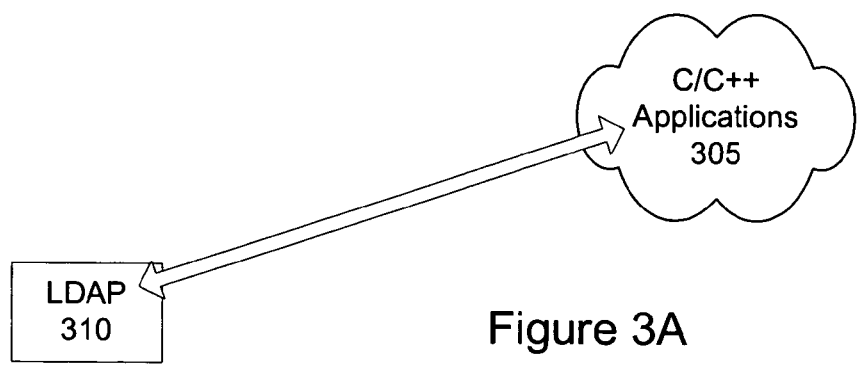
FIGS. 3A and 3B show high-level diagrams of communicating with an LDAP directory server.

FIG. 3A depicts a conventional manner of communicating with an LDAP server. Here, C/C++ Applications 305 communicate directly with the LDAP 310. In this case, VB/VB-.Net/C# applications cannot effectively communicate with the LDAP server.

Figure 3B:
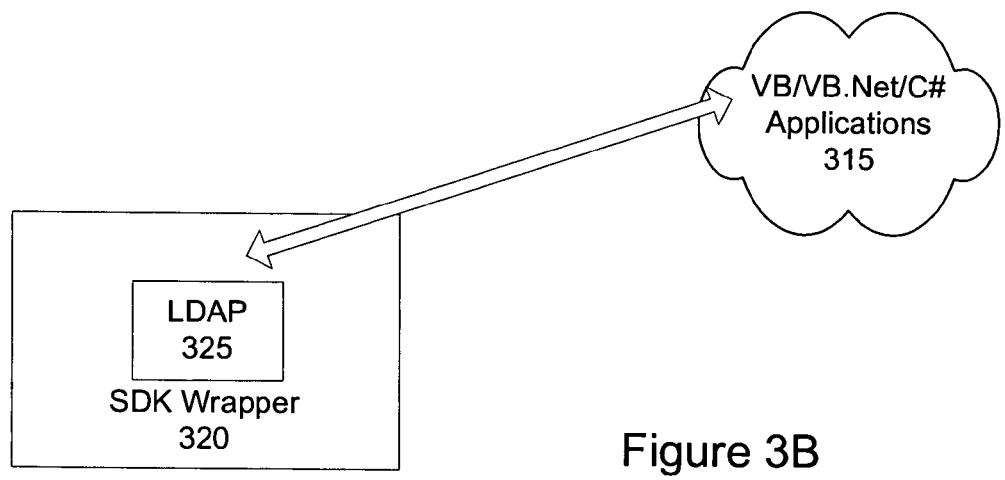

FIG. 3B depicts an improved manner of communicating with an LDAP server, in accordance with a preferred embodiment of the present invention. Here, VB/VB.Net/C# applications 315 communicate with the LDAP 325 by first going through SDK wrapper 320. In the preferred embodiment, the LDAP is a MICROSOFT LDAP SDK software product, e.g., "wldap32.dll".

The preferred embodiment provides a wrapper class for handling the calls to the LDAP SDK using Visual Basic (VB) .Net and incorporating the results into a class file that can be used by all the other .Net languages. The wrapper presents an easy to manage .Net interface to the developer and hides the more complex calls and memory management to the LDAP SDK.

This wrapper class is similar to any other typical wrapper known to those of skill in the art. The basic principle of a wrapper is to hide or encapsulate functionality (typically in the form of a function written in C) and present it in a manner that can be easily used by the desired language.

The preferred embodiment improves on ADSI in that it works well with non-MICROSOFT LDAP servers. The LDAP SDK follows LDAP standards more closely than ADSI and because of this it works with other LDAP servers. The preferred embodiment is also faster than using the ADSI commands when working with non-MICROSOFT LDAP servers.

To integrate the LDAP SDK (or any other C base function or object) into a .Net language a few steps must be taken. Code must be written to interface with the C functions and memory and pointers must be managed. Of those tasks, memory and pointer management are probably the most difficult. Memory management in C is a controlled by the programmer but the .Net languages were designed so that memory and pointers are totally managed by the .Net Framework and not by the programmer. This is one of the main reasons why the .Net languages appeal to such a wide audience. This is also one of the main differences between C and VB .Net.

The disclosed wrapper class automatically handles the interface functions and memory or pointer management. The calling processes then only have to use the wrapper and execute the methods.

Figure 4:
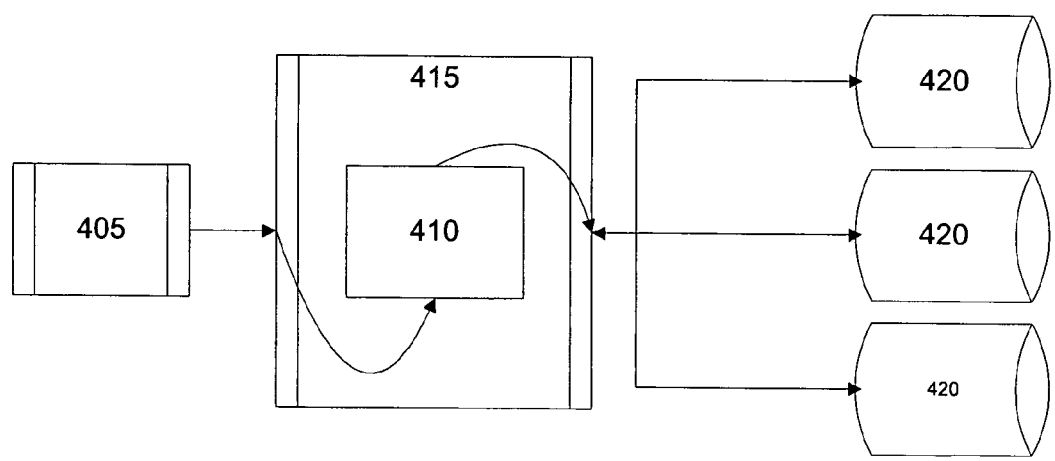
FIG. 4 depicts a block diagram in accordance with a preferred embodiment.

FIG. 4 depicts block diagram of a preferred embodiment of the present invention. Here, using the LDAP Wrapper 415, the VB or C#.Net developer can avoid having to interface with the LDAP SDK 410. The wrapper 415, in this embodiment, is a VB .Net application so interfacing with it is just like interfacing with a regular .Net application. In this diagram, VB/C# applications 405 interface with wrapper 415. Wrapper 415 handles interactions with LDAP SDK 410, including transactions with non-MICROSOFT LDAP servers 420.

Figure 5:
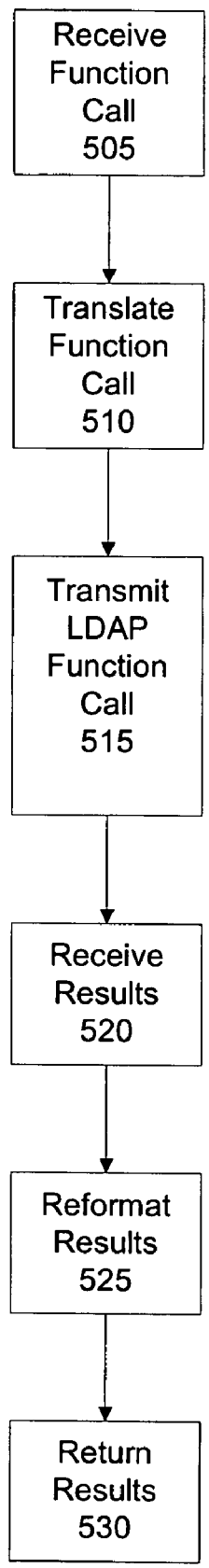
FIG. 5 depicts a flowchart of a process in accordance with a preferred embodiment.

FIG. 5 depicts a process in accordance with a preferred embodiment. Here, the LDAP wrapper will receive a function call in a first programming language, typically a Visual Basic (VB) or C# function call (step 505). Next, the LDAP wrapper will translate the received function call into a second function call in a second programming language, preferably as a C function call (step 510).

Next, the wrapper will transmit an LDAP function call corresponding to second function call to the software service, the software service preferably being a MICROSOFT LDAP SDK software product (step 515).

The wrapper will thereafter receive corresponding results from the software service (step 520), and will format these results to correspond with the first programming language, preferably VB or C# (step 525). Finally, the wrapper will return the formatted results to the calling process (step 530).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method processing a function call, comprising:
    receiving a first function call in a first programming language;
    translating the first function call into a second function call in a second programming language;
    transmitting a lightweight directory access protocol function call, corresponding to the second function call, to a software service;
    receiving results from the software service;
    formatting the results to correspond to the first programming language; and
    returning the formatted results.

2. The method of claim 1, wherein the first programming language is Visual Basic.

3. The method of claim 1, wherein the first programming language is C#.

4. The method of claim 1, wherein the second programming language is C.

5. The method of claim 1, wherein the software service is Microsoft Lightweight Directory Access Protocol Software Development Kit.

6. A data processing system having at least a processor and accessible memory, comprising:
    means for receiving a first function call in a first programming language;
    means for translating the first function call into a second function call in a second programming language;
    means for transmitting a lightweight directory access protocol function call, corresponding to the second function call, to a software service;
    means for receiving results from the software service;
    means for formatting the results to correspond to the first programming language; and
    means for returning the formatted results.

7. The data processing system of claim 6, wherein the first programming language is Visual Basic.

8. The data processing system of claim 6, wherein the first programming language is C#.

9. The data processing system of claim 6, wherein the second programming language is C.

10. The data processing system of claim 6, wherein the software service is Microsoft Lightweight Directory Access Protocol Software Development Kit.

11. A computer program product tangibly embodied in a first machine-readable medium, comprising:
    instructions for receiving a first function call in a first programming language;
    instructions for translating the first function call into a second function call in a second programming language;
    instructions for transmitting a lightweight directory access protocol function call, corresponding to the second function call, to a software service;
    instructions for receiving results from the software service;
    instructions for formatting the results to correspond to the first programming language; and
    instructions for storing the formatted results in a second machine-readable medium and returning the formatted results.

12. The computer program product of claim 11, wherein the first programming language is Visual Basic.

13. The computer program product of claim 11, wherein the first programming language is C#.

14. The computer program product of claim 11, wherein the second programming language is C.

15. The computer program product of claim 11, wherein the software service is Microsoft Lightweight Directory Access Protocol Software Development Kit.

* * * * *